United States Patent
Funakoshi et al.

(10) Patent No.: US 9,303,568 B2
(45) Date of Patent: Apr. 5, 2016

(54) OUTPUT CONTROL DEVICE FOR VEHICLE

(71) Applicant: MITSUBISHI JIDOSHA KOGYO KABUSHIKI KAISHA, Tokyo (JP)

(72) Inventors: Hiroshi Funakoshi, Okazaki (JP); Satoru Nakamura, Chiryu (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/607,532

(22) Filed: Jan. 28, 2015

(65) Prior Publication Data
US 2015/0240728 A1  Aug. 27, 2015

(30) Foreign Application Priority Data
Feb. 21, 2014  (JP) .................................. 2014-031914

(51) Int. Cl.
| | |
|---|---|
| G06F 7/70 | (2006.01) |
| G06F 19/00 | (2011.01) |
| G06G 7/00 | (2006.01) |
| G06G 7/76 | (2006.01) |
| F02D 11/10 | (2006.01) |
| F02D 41/22 | (2006.01) |
| F02D 29/02 | (2006.01) |

(52) U.S. Cl.
CPC .............. *F02D 11/105* (2013.01); *F02D 29/02* (2013.01); *F02D 41/22* (2013.01); *F02D 2200/1004* (2013.01); *F02D 2250/26* (2013.01)

(58) Field of Classification Search
CPC ......... B60T 8/1755; B60T 8/172; B60T 7/22; B60W 10/184; B60W 10/18; F02D 29/02; F02D 11/105
USPC ........................................................... 701/70
See application file for complete search history.

(56) References Cited

U.S. PATENT DOCUMENTS

| | | |
|---|---|---|
| 2005/0000276 A1 | 1/2005 | Bauer et al. |
| 2009/0167227 A1* | 7/2009 | Gwinner ................. F02D 41/22 318/434 |

FOREIGN PATENT DOCUMENTS

| | | |
|---|---|---|
| DE | 102006039706 A1 | 2/2008 |
| JP | 2009-127549 A | 6/2009 |

* cited by examiner

*Primary Examiner* — Maceeh Anwari
(74) *Attorney, Agent, or Firm* — Birch, Stewart, Kolasch & Birch, LLP

(57) ABSTRACT

An output control device configured to control the output of a running drive source mounted on a vehicle includes an anomaly discriminator which judges that the output control device is anomalous, if excess acceleration G (output difference index) of the vehicle remains greater than or equal to a predetermined threshold value G1, . . . , G7 for a predetermined time t1, . . . , t7 or longer, wherein the predetermined time t1, . . . , t7 for the anomaly discrimination is set so as to shorten with increase in the threshold value G1, . . . , G7 of the excess acceleration of the vehicle.

7 Claims, 4 Drawing Sheets

OUTPUT CONTROL DEVICE FOR VEHICLE

BACKGROUND OF THE INVENTION

1. Field of the Invention

The present invention relates to a control device for controlling a drive source for running a vehicle, and more particularly, to a technique of discriminating anomaly of output control for such a running drive source.

2. Description of the Related Art

In recent years, drive-by-wire systems have come to be employed in vehicles mounted with an internal combustion engine (engine) or motor as a running drive source. In such a drive-by-wire system, a target torque (target output) is calculated in accordance with information on the operation of an accelerator pedal or the like, a target throttle opening for attaining the target torque is calculated, an actual throttle opening with which torque is being actually generated is detected using a throttle position sensor, and the throttle is controlled so that the actual torque may become equal to the target torque.

There have also been proposed anomaly discrimination techniques for the control devices of drive-by-wire systems. In the control device disclosed in Japanese Unexamined Patent Publication No. 2009-127549, for example, a difference between a target throttle valve opening calculated from a target torque and an actual throttle valve opening is obtained, and if the throttle opening difference is greater than a discrimination threshold value set on the basis of the target throttle opening and the engine rotating speed, it is judged that anomaly has occurred.

The engine rotating speed and the engine output torque vary and are not always the same. Thus, in cases where it is judged that anomaly has occurred when the difference (throttle opening difference) between the value related to the target torque and the value related to the actual torque is greater than the threshold value as in the above patent publication, the discrimination threshold value needs to be set to a large value in order to restrain erroneous anomaly discrimination.

If the threshold value for anomaly discrimination is set to a large value, however, accuracy of the anomaly discrimination lowers. Safety in case of anomaly is low especially when the engine is operating in a high-output condition as during acceleration of the vehicle, compared with the case where the engine is operating in a low-output condition, and therefore, it is desirable that anomaly discrimination should be made quickly and reliably.

SUMMARY OF THE INVENTION

The present invention was made to solve the above problem, and an object thereof is to provide an output control device for a vehicle whereby anomaly can be appropriately discriminated, thereby improving safety.

To achieve the object, the present invention provides an output control device configured to control output of a running drive source mounted on a vehicle, the output control device including: an allowable output calculator which calculates, based on operation of an accelerator of the vehicle, an allowable output that the running drive source is allowed to generate in response to a driver's request; an estimated output calculator which calculates, based on an operating condition of the vehicle, an estimated output that is estimated to be actually output by the running drive source; an output difference index calculator which calculates an output difference index correlated with a difference between the allowable output and the estimated output; and an anomaly discriminator which judges that the output control device is anomalous, if the output difference index calculated by the output difference index calculator remains greater than or equal to a predetermined threshold value for a predetermined time or longer, wherein the predetermined time is set so as to shorten with increase in the output difference index.

Thus, the output difference index is calculated on the basis of the difference between the allowable output and the estimated output, and is used to determine whether or not the output being generated is higher than the output that is allowed to be generated to achieve the operating condition requested by the driver. Since the predetermined time for anomaly discrimination shortens with increase in the output difference index, anomaly can be discriminated in a shorter time when the output difference index is greater, whereby safety of the vehicle can be increased.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

An embodiment of the present invention will be described below with reference to the drawings.

An output control device according to the embodiment of the present invention is an output control device for an engine (internal combustion engine) mounted on a vehicle for driving the vehicle. For the engine, a gasoline engine is employed by way of example, and the vehicle is equipped with a drive-by-wire system.

The drive-by-wire system is configured such that the opening, or position, of an electronically controlled throttle valve 2 is controlled by an engine electronic control unit (hereinafter referred to as engine ECU) 1 (output control device) in accordance with information on the operation of an accelerator pedal or the like of the vehicle.

Figure 1:
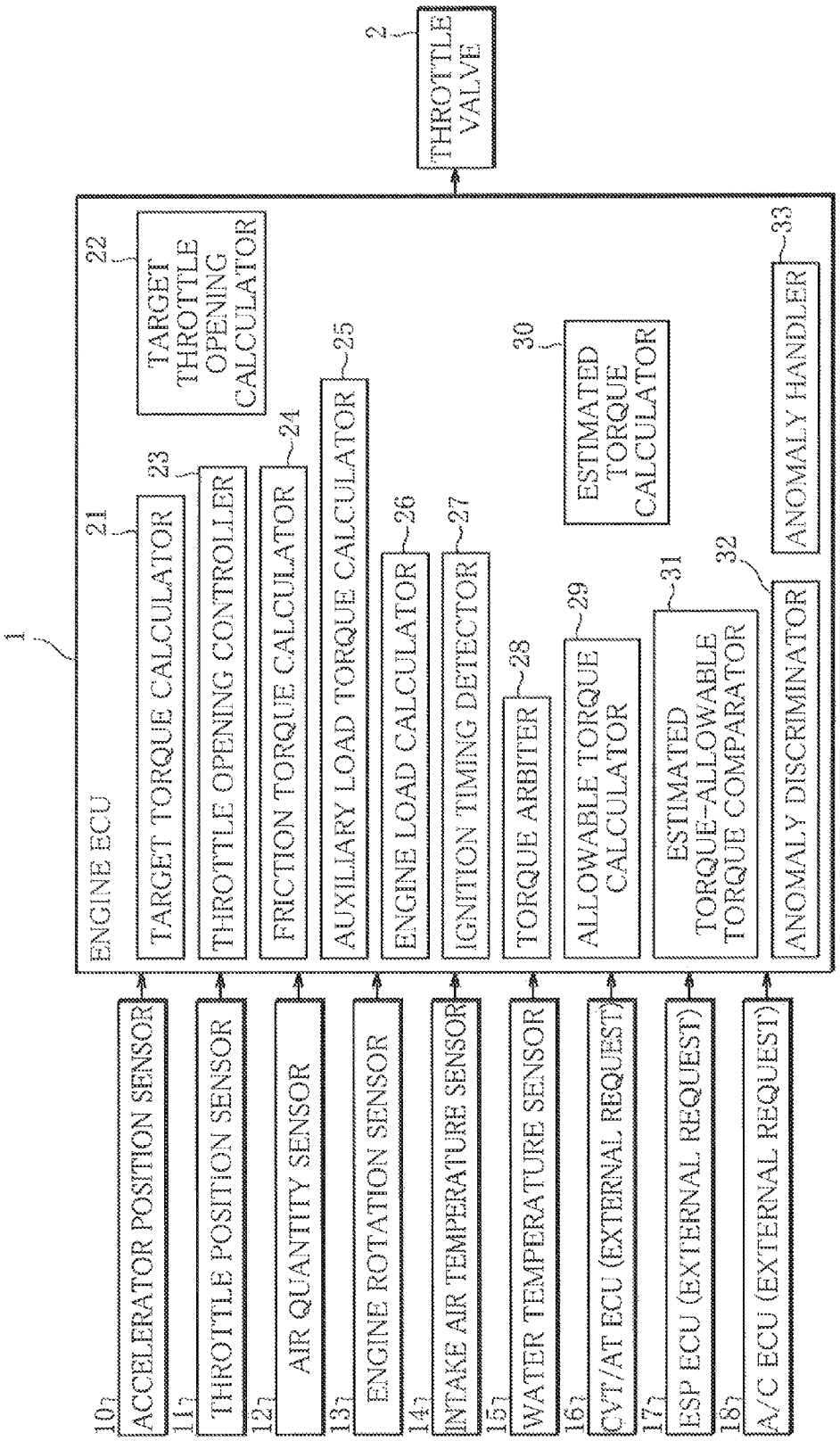
FIG. 1 is a control block diagram illustrating an entire configuration of an output control device for a vehicle according to the present invention.

FIG. 1 is a control block diagram illustrating an entire configuration of engine control that is periodically executed by the engine ECU 1.

As illustrated in FIG. 1, the engine ECU 1 is connected at its input side with various sensors including an accelerator position sensor 10 for detecting an amount of operation of the accelerator pedal by a driver of the vehicle, a throttle position sensor 11 for detecting the opening of the throttle valve 2, an air quantity sensor (airflow sensor) 12 for detecting the flow rate of intake air being taken in the engine, an engine rotation sensor 13 for detecting the rotating speed of the engine (e.g., based on transition of the crank angle), an intake air temperature sensor 14 for detecting the temperature of the intake air, and a water temperature sensor 15 for detecting the temperature of tooling water, to be input with various detection signals from these sensors. Also, the engine ECU 1 is connected with control devices such as a CVT/AT ECU 16 for controlling a transmission of the vehicle, an ESP ECU 17 for performing position stability control of the vehicle, and an A/C ECU 18 for controlling an air conditioner of the vehicle, to be input with output requests (external requests) for the engine from these control devices. On the other hand, the engine ECU 1 is connected at its output side with the throttle valve 2.

The engine ECU 1 is provided with a variety of functional parts including a target torque calculator 21, a target throttle opening calculator 22, a throttle opening controller 23, a friction torque calculator 24, an auxiliary load torque calculator 25, an engine load calculator 26, an ignition timing detector 27, a torque arbiter 28, an allowable torque calculator (allowable output calculator) 29, an estimated torque calculator (estimated output calculator) 30, an estimated torque-allowable torque comparator 31 (output difference index calculator), an anomaly discriminator 32, and an anomaly handler 33.

Based on the accelerator operation information from the accelerator position sensor 10 and the engine rotating speed from the engine rotation sensor 13, the target torque calculator 21 calculates a target torque to be output by the engine, through the addition of an engine load torque calculated by the engine load calculator 26, as described later.

The target throttle opening calculator 22 calculates a target throttle opening for attaining the target torque calculated by the target torque calculator 21.

The throttle opening controller 23 controls the opening of the throttle valve 2 such that throttle control information (actual throttle opening) from the throttle position sensor 11 becomes equal to the target throttle opening calculated by the target throttle opening calculator 22.

The friction torque calculator 24 calculates a friction torque of the engine on the basis of the engine rotating speed from the engine rotation sensor 13 and the cooling water temperature from the water temperature sensor 15.

The auxiliary load torque calculator 25 calculates a load torque of auxiliary machinery on the basis of the external request from the A/C ECU 18.

The engine load calculator 26 calculates a load torque of the engine by adding together the friction torque of the engine, calculated by the friction torque calculator 24, and the load torque of the auxiliary machinery, calculated by the auxiliary load torque calculator 25.

The ignition timing detector 27 has the function of detecting ignition timing from an ignition signal for the engine.

The torque arbiter 28 has the function of arbitrating between external torque requests from the ECUs 16 and 17 and the target torque calculated by the target torque calculator 21.

The allowable torque calculator 29 calculates an allowable torque (allowable output) in accordance with the accelerator operation information. More specifically, the allowable torque calculator 29 reads an allowable torque corresponding to the operating condition, from an allowable torque map in which allowable torques are set beforehand with reference to the accelerator operation amount and the engine rotating speed.

The allowable torque denotes a torque that is allowed for the achievement of the operating condition requested by the driver. In this embodiment, the allowable torques are determined in advance by experiment.

The estimated torque calculator 30 calculates, from the intake air quantity from the air quantity sensor 12 and the engine rotating speed, a torque (estimated torque) that is estimated to be actually output by the engine.

The estimated torque-allowable torque comparator 31 compares the estimated torque calculated by the estimated torque calculator 30 with the allowable torque calculated by the allowable torque calculator 29. More specifically, the estimated torque-allowable torque comparator 31 calculates a difference between the estimated torque and the allowable torque, that is, an excess acceleration G (output difference index).

If the excess acceleration G remains greater than or equal to a threshold value (G1, . . . , Gn) for a predetermined time (discrimination time t1, . . . , tn), the anomaly discriminator 32 judges that anomaly has occurred.

When it is judged by the anomaly discriminator 32 that anomaly has occurred, the anomaly handler 33 executes control for increasing safety (anomaly handling process). For example, the anomaly handler 33 lowers the engine output by limiting the opening of the throttle valve or retarding the ignition timing.

Figure 2:
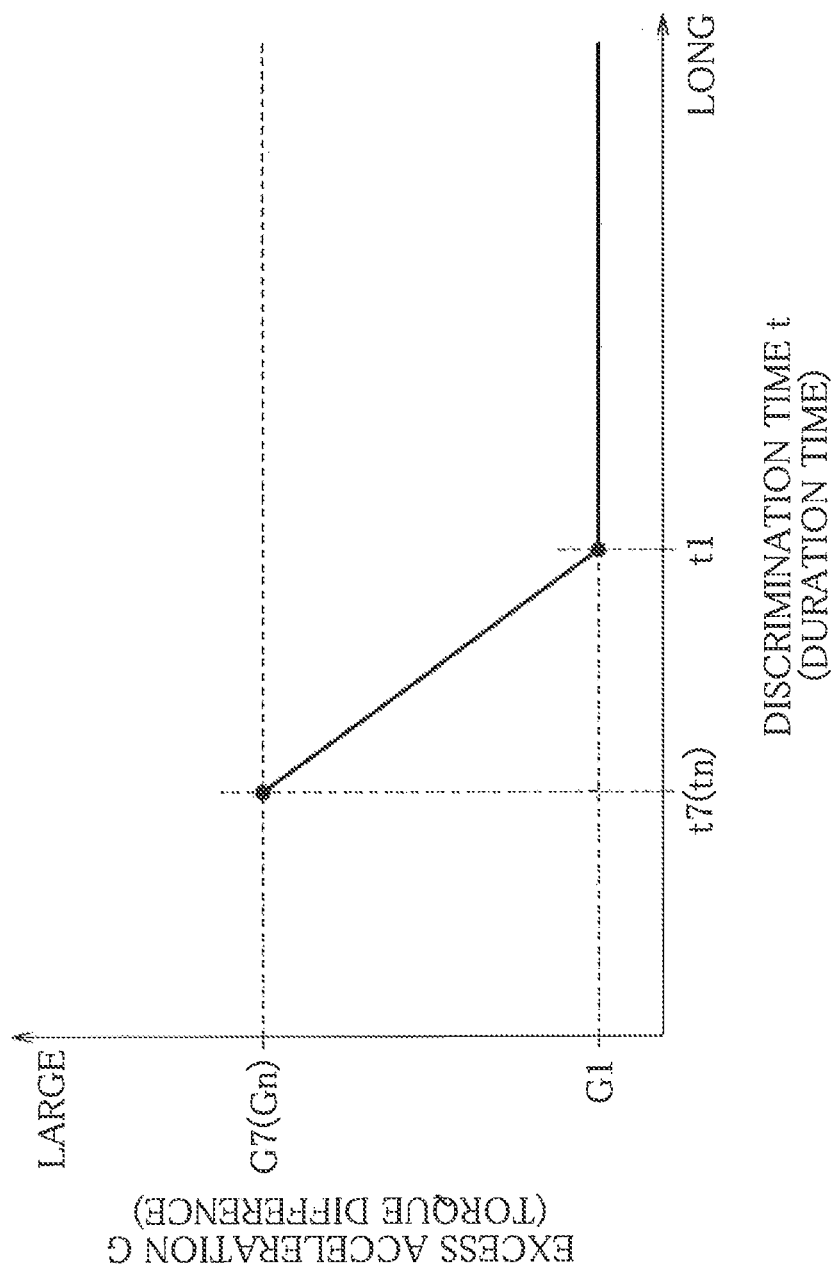
FIG. 2 is a graph illustrating the relationship between an excess acceleration threshold value and an anomaly discrimination time.

FIG. 2 is a map illustrating the relationship between the excess acceleration G and the timer discrimination time t (duration time). Further, values are set in the engine ECU 1 as a function of the excess acceleration and the duration time, and the engine ECU 1 has the function of increasing safety by, for example, giving a warning or limiting the engine output when the excess acceleration and the duration time exceed a boundary line indicated by the broken lines in FIG. 2.

Figure 3:
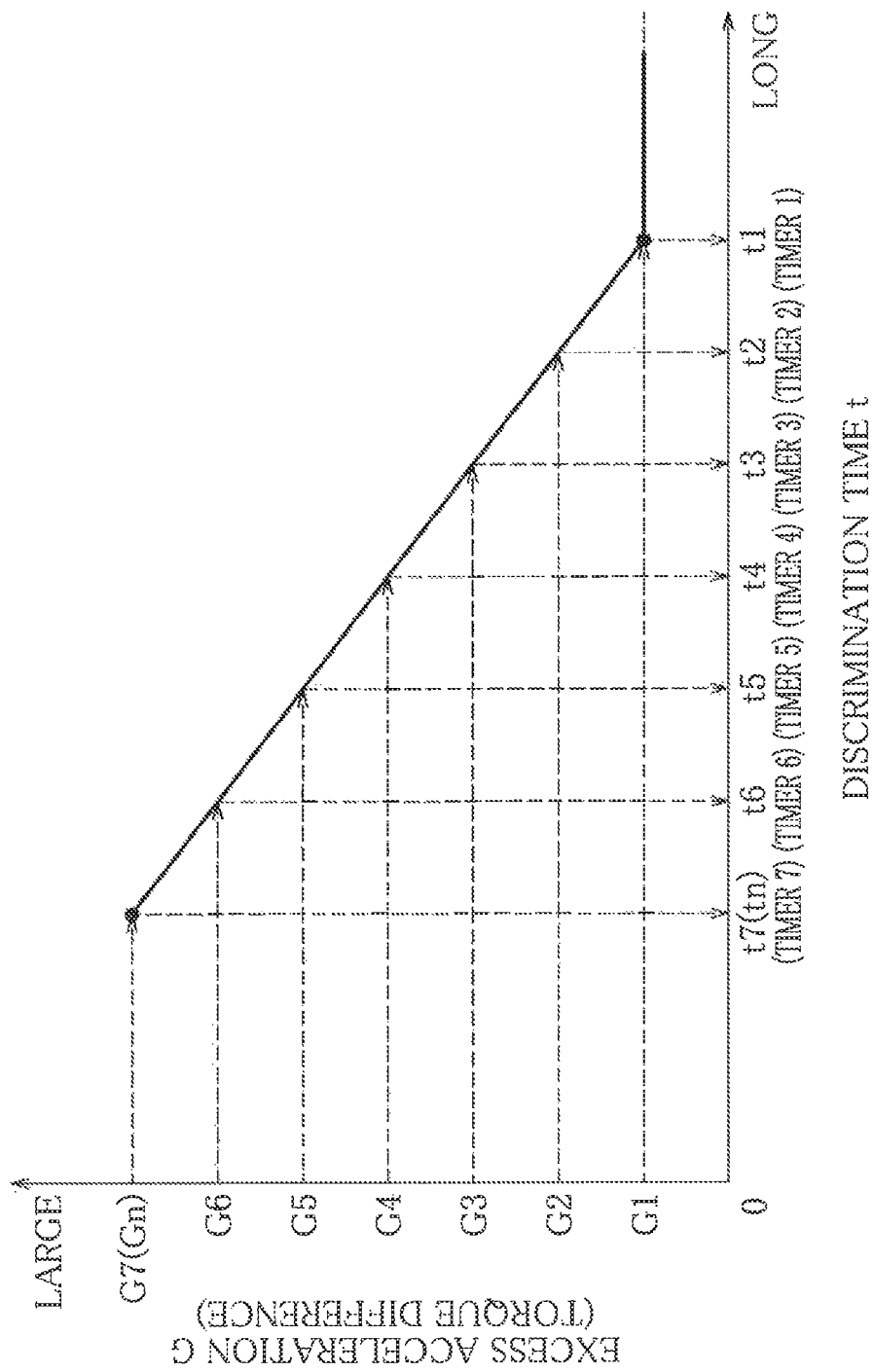
FIG. 3 is a graph illustrating in more detail the relationship between the excess acceleration threshold value and the anomaly discrimination time.

FIG. 3 is a map illustrating details of the relationship between the threshold value G1, . . . , Gn of the excess acceleration G and the timer discrimination time t1, . . . , tn. As seen from FIGS. 2 and 3, the timer discrimination time t is set so as to vary with the excess accelerations G. Specifically, the greater the excess acceleration G, the shorter the timer discrimination time t is.

A minimum threshold value G1 of the excess acceleration G may be set to a value slightly greater than a maximum acceleration during creep running of the vehicle, for example, and a discrimination time t1 for the minimum threshold value G1 may be set, for example, to one second or thereabouts (0.8 to 1.2 sec) (first data).

A maximum threshold value Gn of the excess acceleration G and a discrimination time tn therefor (second data) may be appropriately set in advance by verification through testing or the like so that the occurrence of anomaly may be concluded when the excess acceleration G of the vehicle remains greater than or equal to an appropriate maximum threshold value Gn for an appropriate discrimination time tn.

Further, in this embodiment, a plurality of anomaly discrimination threshold values of the excess acceleration G are set stepwise between the minimum threshold value G1 and the maximum threshold value G7 (Gn), as shown in FIG. 3. The total number of the anomaly discrimination threshold values G1 to G7 is seven.

Specifically, the numerical value range between the minimum threshold value G1 and the maximum threshold value G7 is divided into six to set intermediate threshold values G2 to G6, then the intersection between the minimum threshold value G1 and the discrimination time t1 associated therewith and the intersection between the maximum threshold value G7 and the discrimination time t7 associated therewith are connected by a straight line, and the intersections of the intermediate threshold values G2 to G6 with the straight line are set as respective discrimination times (t2 to t6).

The engine ECU 1 is provided with seven timers (n measuring units) associated with the respective combinations of the threshold values G1 to G7 of the excess acceleration G with the discrimination times t1 to t7. The timers 1 to 7 each have the function of independently measuring the duration time for which the excess acceleration G of the vehicle remains greater than or equal to the corresponding threshold value.

Figure 4:
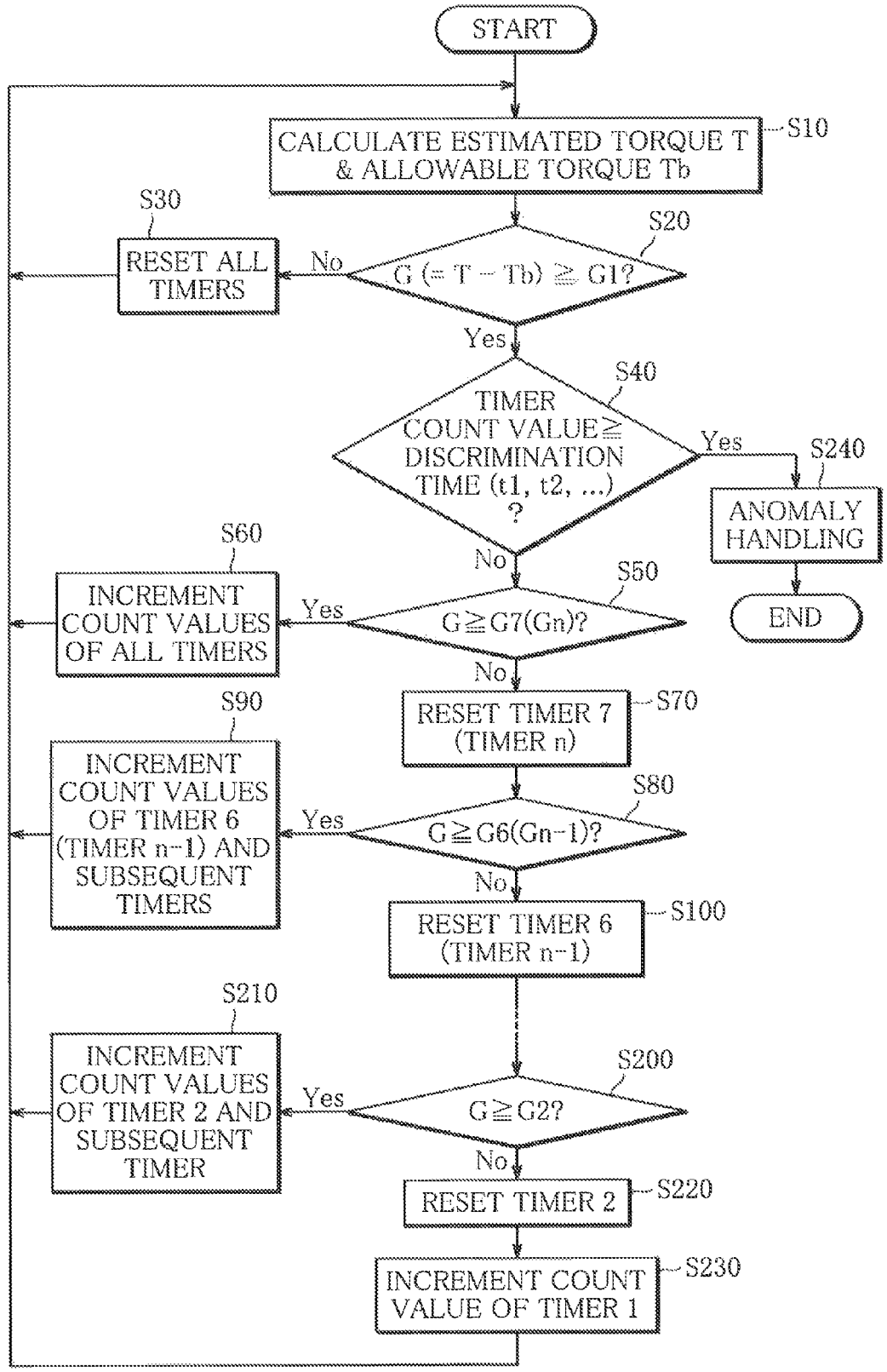
FIG. 4 is a flowchart illustrating a routine for an anomaly discrimination and handling process executed by an engine ECU according to the present invention.

FIG. 4 is a flowchart illustrating a routine for an anomaly discrimination and handling process executed by the engine ECU 1.

The routine is repeatedly executed during operation of the engine.

First, in Step S10, the allowable torque Tb and the estimated torque T are calculated respectively by the allowable torque calculator 29 and the estimated torque calculator 30. The routine then proceeds to Step S20.

In Step S20, a torque difference T−Tb between the estimated torque T and the allowable torque Tb, calculated in Step S10, is obtained, and it is then determined whether or not the excess acceleration G represented by the torque difference T−Tb takes a value greater than or equal to the minimum threshold value G1. If the excess acceleration G is less than the minimum threshold value G1, the routine proceeds to Step S30. On the other hand, if the excess acceleration G is greater than or equal to the minimum threshold value G1, the routine proceeds to Step S40.

In Step S30, all timers are reset. The routine then returns to Step S10.

In Step S40, it is determined with respect to the count value of each timer whether or not the count value takes a value greater than or equal to the corresponding one of the discrimination times t1 to t7 associated with the respective timer threshold values G1 to G7, thereby determining whether at least one of the timer count values is greater than or equal to the corresponding discrimination time. If at least one of the timer count values is greater than or equal to the corresponding discrimination time, the routine proceeds to Step S240. On the other hand, if all of the timer count values are less than the respective discrimination times, the routine proceeds to Step S50.

In Step S50, it is determined whether or not the excess acceleration G assumes a value greater than or equal to the maximum threshold value G7 (Gn). If the excess acceleration G is greater than or equal to the maximum threshold value G7, the routine proceeds to Step S60. On the other hand, if the excess acceleration G is less than the maximum threshold value G7, the routine proceeds to Step S70.

In Step S60, the count values of all timers are incremented. The routine then returns to Step S10.

In Step S70, the timer 7 (timer n) is reset. The routine then proceeds to Step S80. In Step S80, it is determined whether or not the excess acceleration G assumes a value greater than or equal to the set threshold value G6 (Gn−1). If the excess acceleration G is greater than or equal to the threshold value G6, the routine proceeds to Step S90. On the other hand, if the excess acceleration G is less than the threshold value G6, the routine proceeds to Step S100.

In Step S90, the count values of the timer 6 (timer n−1) and the subsequent timers (timer 6, timer 5, . . . , timer 1) are all incremented. The routine then returns to Step S10.

In Step S100, the timer 6 (timer n−1) is reset. Subsequently, the same control as in Steps S80, S90 and S100 is executed sequentially with respect to the timer n−2, the timer n−3, . . . , and the timer 2. The routine then proceeds to Step S200.

In Step S200, it is determined whether or not the excess acceleration G assumes a value greater than or equal to the set threshold value G2. If the excess acceleration G is greater than or equal to the threshold value G2, the routine proceeds to Step S210. On the other hand, if the excess acceleration G is less than the threshold value G2, the routine proceeds to Step S220.

In Step S210, the count values of the timer 2 and the subsequent timer (timer 2, timer 1) are incremented. Then, the routine returns to Step S10.

In Step S220, the timer 2 is reset. The routine then proceeds to Step S230.

In Step S230, the count value of the timer 1 is incremented. Then, the routine returns to Step S10.

In Step S240, it is judged that the engine ECU 1 is anomalous, and the anomaly handling process is executed by the anomaly handler 33. Then, the routine ends.

According to the embodiment, the throttle opening of the engine is controlled by the target torque calculator 21, the target throttle opening calculator 22 and the throttle opening controller 23 of the engine ECU 1 such that the actual torque becomes equal to the target torque, and the control procedure described above provides a safety device whereby the engine ECU 1 is judged to be anomalous if the excess acceleration G of the vehicle remains greater than or equal to the threshold value G1, . . . , G7 for the discrimination time t1, . . . , tn or longer.

While the engine ECU 1 is normal, the operation of the throttle valve of the engine is controlled by the target torque calculator 21, the target throttle opening calculator 22 and the throttle opening controller 23 such that the actual torque becomes equal to the target torque, and therefore, the torque difference between the allowable torque and the estimated torque is eliminated in a short time. When the excess acceleration G of the vehicle remains greater than or equal to the threshold value G1, . . . , Gn for the discrimination time t1, . . . , tn or longer, it is possible that anomaly may have occurred in the resources section of the calculation program stored in the engine ECU 1. Failure of the calculation function itself can be determined by other safety function as, for example, an absence of the output of operation results, but it is difficult to detect an anomaly occurring in the resources section only. According to the embodiment, by determining whether the excess acceleration G has been eliminated or not, it is possible to easily detect an anomaly of the output torque control as a whole as well as an anomaly occurring in the resources section only.

Also, in this embodiment, the multiple anomaly discrimination threshold values G1 to Gn (G7) are set for the excess acceleration G and are associated with the respective different discrimination times t1 to tn (t7), so that anomaly can be discriminated precisely. Since the discrimination time t is set such that a shorter discrimination time is applied to a greater threshold value of the excess acceleration G, anomaly is discriminated more quickly with increase in the excess acceleration G of the vehicle, whereby safety can be enhanced.

The excess acceleration G of the vehicle used for the discrimination of anomaly is calculated on the basis of the difference between the allowable torque Tb and the estimated torque T (actual torque), and therefore, the anomaly discrimination can be carried out without the need for an additional detection device such as an acceleration sensor. Also, since the operation of the throttle valve of the engine is controlled by the target torque calculator 21, the target throttle opening calculator 22 and the throttle opening controller 23 so that the actual torque may become equal to the target torque, anomaly of the target torque calculator 21, the target throttle opening calculator 22 and the throttle opening controller 23 can also be detected by making the anomaly determination as to whether or not the state in which the difference between the allowable torque Tb and the estimated torque T remains greater than or equal to the threshold value continues for the predetermined time (discrimination time).

In this embodiment, the threshold values G1 to G7 are set with respect to the excess acceleration G, and the timers are associated with the respective threshold value G1 to G7 to independently measure the duration times over which the excess acceleration G remains greater than or equal to the respective threshold values G1 to G7. Accordingly, even while the excess acceleration G fluctuates, the anomaly discrimination can be performed simultaneously by means of the threshold values G1 to G7 associated with the respective discrimination times t1 to t7. This makes it possible to improve accuracy of the anomaly discrimination during transient operation.

Also, the multiple anomaly discrimination threshold values G1 to G7 of the excess acceleration G and the multiple discrimination times t1 to t7 associated therewith are set on the map by connecting the intersection between the minimum threshold value G1 and its associated discrimination time t1 and the intersection between the maximum threshold value G7 and its associated discrimination time t7 by a straight line, and reading intermediate numerical values lying on the straight line between the minimum threshold value G1 and the maximum threshold value G7 as discrimination times, that is, interpolating intermediate discrimination times between the discrimination time t1 associated with the minimum threshold value G1 and the discrimination time t7 associated with the maximum threshold value G7. Thus, by storing the discrimination time t1 for the minimum threshold value G1 and the discrimination time t7 for the maximum threshold value G7, it is possible to derive intermediate discrimination times by calculation, whereby more threshold values and their associated discrimination times can be set with ease, enabling more accurate anomaly discrimination during transient operation.

Further, the engine ECU 1 is provided with the anomaly handler, and when anomaly is detected by the anomaly discriminator 32, the anomaly handler controls the opening of the throttle valve 2 so as to lower the engine output. Accordingly, when anomaly is detected while the vehicle is running, for example, running safety can be improved by lowering the engine output.

The present invention is not limited to the foregoing embodiment. For example, the number of the threshold values G1 to G7 of the excess acceleration G and the number of the discrimination times t1 to t7 may each be set to a number other than seven. Also, the intermediate values between the discrimination times associated with the minimum and maximum threshold values G1 and G7 may be interpolated by means of a function other than the linear function. Instead of calculating the intermediate values by interpolation, the intermediate values may be stored beforehand. In the above embodiment, various torques such as the target torque, the allowable torque and the estimated torque are calculated and compared to discriminate anomaly, but the object to which the present invention is applicable is not limited to torque and may be an output or a value related thereto. Further, the present invention can be applied to vehicles equipped as their running drive source with a motor or other output generation source.

What is claimed is:

1. An output control device configured to control output torque of a running drive source mounted on a vehicle, comprising:
    a plurality of measuring units which measure, for a plurality of predetermined threshold values, amounts of time for which an output difference index remains greater than or equal to the respective threshold values;
    an electronic control unit that controls the drive source; and
    a storage medium, having stored there on instructions which when read by the electronic control unit cause the electronic control unit to perform the steps of
    calculating, based on operation of an accelerator of the vehicle, an allowable torque that the running drive source is allowed to generate in response to a driver's request;
    calculating, based on an operating condition of the vehicle, an estimated torque that is estimated to be actually output by the running drive source;
    calculating an output difference index correlated with a difference between the allowable torque and the estimated torque; and
    determining whether or not the amounts of time measured by the plurality of measuring units are greater than or equal to respective discrimination times predetermined for the respective threshold values and judging that the output control device is anomalous if at least one of the amounts of time measured by the measuring units is determined to be greater than or equal to its associated discrimination time
    wherein the discrimination times are predetermined such that discrimination times for greater threshold values are shorter.

2. The output control device according to claim 1, wherein the plurality of threshold values are set in a stepwise manner.

3. The output control device according to claim 1, wherein the output difference index is excess acceleration of the vehicle.

4. The output control device according to claim 3, wherein the plurality of threshold values and the respective discrimination times are set by interpolation between previously stored first data corresponding to a minimum acceleration of the vehicle and previously stored second data corresponding to a maximum acceleration of the vehicle.

5. The output control device according to claim 4, wherein the first data corresponding to the minimum acceleration of the vehicle is a value based on a maximum acceleration during creep running of the vehicle, and a discrimination time associated with the first data is 0.8 to 1.2 seconds.

6. The output control device according to claim 1, wherein:
    the allowable torque is calculated based on an engine rotating speed and an amount of operation of the accelerator of the vehicle, and
    the estimated torque is calculated based on a quantity of intake air taken in the engine and the engine rotating speed.

7. The output control device according to claim 1, wherein the instructions further cause the electronic control unit to
    control the running drive source when an anomaly is detected, in such a manner that the output of the running drive source lowers.

* * * * *